(12) United States Patent
Keaveny et al.

(10) Patent No.: US 9,697,491 B2
(45) Date of Patent: Jul. 4, 2017

(54) SYSTEM AND METHOD FOR ANALYZING PERFORMANCE DATA IN A TRANSIT ORGANIZATION

(71) Applicant: Trapeze Software ULC, Mississauga (CA)

(72) Inventors: Ian Keaveny, Burlington (CA); Sebastien James Hinds, Trowbridge (GB); Andrew Henry Leitch Kerr, Stenhousemuir (GB)

(73) Assignee: Trapeze Software ULC, Mississauga (CA)

( * ) Notice: Subject to any disclaimer, the term of this patent is extended or adjusted under 35 U.S.C. 154(b) by 665 days.

(21) Appl. No.: 14/134,960

(22) Filed: Dec. 19, 2013

(65) Prior Publication Data

US 2015/0178661 A1     Jun. 25, 2015

(51) Int. Cl.
| | | |
|---|---|---|
| *G06Q 10/00* | (2012.01) | |
| *G06Q 10/06* | (2012.01) | |
| *G06Q 50/30* | (2012.01) | |
| *G07C 5/00* | (2006.01) | |
| *G07C 5/08* | (2006.01) | |

(52) U.S. Cl.
CPC ....... *G06Q 10/06398* (2013.01); *G06Q 50/30* (2013.01); *G07C 5/008* (2013.01); *G07C 5/085* (2013.01)

(58) Field of Classification Search
CPC ....... B60W 2520/105; B60W 2550/12; B60W 2550/14; B60W 40/09; G01C 21/3697
See application file for complete search history.

(56) References Cited

U.S. PATENT DOCUMENTS

| | | | |
|---|---|---|---|
| 2008/0212681 A1 | 9/2008 | Yavlis et al. | |
| 2011/0161138 A1* | 6/2011 | Keaveny | G06Q 10/06 705/7.38 |
| 2011/0251752 A1 | 10/2011 | DeLarocheliere et al. | |
| 2011/0307188 A1* | 12/2011 | Peng | G06Q 10/0639 702/33 |
| 2014/0099607 A1* | 4/2014 | Armitage | B60W 40/09 434/66 |
| 2015/0134226 A1* | 5/2015 | Palmer | B60W 40/10 701/101 |

* cited by examiner

*Primary Examiner* — Omeed Alizada
(74) *Attorney, Agent, or Firm* — Elan IP Inc.

(57) ABSTRACT

The present invention relates to a system and method for analyzing performance data in a transit organization. Accelerometer metrics are collected for a vehicle along a first axis. The metrics collected from the vehicle are summarized by unit measurement. The metrics summarized by unit measurement are then stored in storage.

15 Claims, 6 Drawing Sheets

SYSTEM AND METHOD FOR ANALYZING PERFORMANCE DATA IN A TRANSIT ORGANIZATION

FIELD OF THE INVENTION

The present invention relates to the field of vehicle system monitoring. In particular, it relates to a system and method for analyzing performance data in a transit organization.

BACKGROUND OF THE INVENTION

One of the major challenges for transit organizations is customer experience measurement. A large part of the customer experience relates to the "smoothness" of the ride. In order to provide a smooth ride, both acceleration and deceleration, typically as a result of braking, should be slow. Hard acceleration and braking can lead to discomfort for vehicle passengers, as they have to brace themselves. In addition, making turns (referred to as "cornering") while the vehicle is travelling quickly can also lead to vehicle passenger discomfort. Further, where possible, changes in the rate of acceleration and braking should be slow. Sudden changes in the rate of acceleration lead to a "jerky" ride, and can, in some cases, lead to injury of the vehicle passengers.

Another major challenge for transit organizations is keeping fuel consumption low. Fuel represents a significant portion of the day-to-day costs for a transit organization. A contributing factor to poor fuel consumption is hard acceleration. By simply accelerating at a slower rate, and by proper anticipation of the road and traffic conditions ahead, the fuel consumption of a vehicle can be significantly reduced.

Still another challenge for transit organizations is to keep maintenance costs low. Maintenance costs consist of not only the cost of servicing a vehicle, but also the cost of having to replace that vehicle on the road. One part of maintenance costs relates to servicing of the brake systems of vehicles. Hard braking can significantly reduce the time between replacement of brake system components.

The smoothness of the ride is a result of a number of factors, including the driving habits of the driver and the condition of the vehicle itself. A driver may accelerate and/or brake harder than at a desired level, leading to the above-noted issues. It can be desirable to identify, on an ongoing basis, specific drivers who would most benefit from targeted driver training in order to keep training costs low and reduce interruption of the daily operation of the transit organization. The process of identifying drivers that would best benefit from driver training, however, can prove very difficult. Direct attribution of the poor fuel economy of a vehicle to the driver operating the vehicle can result in a number of drivers being incorrectly flagged as being good candidates for driver training. There are, in fact, a number of parameters that impact the fuel economy of transit vehicles, such as the type of vehicle, the route travelled, the fare and traffic load along the route (which is largely dependant on the day and time), the weather conditions, etc. Many of these factors cannot be controlled, however. Other methods of evaluating drivers for driver training are available, such as having a skilled assessor ride in a vehicle being operated by a driver. Should the driver be aware of the presence of an assessor, however, he may consciously or subconsciously alter his driving style temporarily, thus possibly incorrectly rejecting the driver as a good candidate for driver training.

Similarly, it can also be desirable to identify vehicles that are performing poorly. A vehicle with a faulty transmission can lead to a jerky ride. As local maintenance is costly, it can be desirable to prioritize vehicles in terms of their condition and, thus, candidacy for servicing. For the most part, vehicle condition is reported by drivers when a vehicle exhibiting clear signs of requiring service, such as an engine running very roughly, visible smoke from the exhaust, or a significantly underinflated tire. Otherwise, the condition of the vehicle is generally assessed very infrequently when undergoing a regular scheduled maintenance. As a result, vehicles exhibiting less prominent symptoms may not be quickly identified for servicing.

It is therefore an object of this invention to provide a system and method for analyzing performance data in a transit organization.

SUMMARY OF THE INVENTION

There is a method for analyzing the performance of a driver of a vehicle, using one or more metrics, in a transit organization, comprising: collecting, from one or more sources of acceleration data on the vehicle in each collection period during a unit measurement, metrics, the metrics comprising a set of acceleration metrics from the vehicle, summarizing said metrics from each collection period collected from said vehicle during the unit measurement, and scoring the performance of the driver of the vehicle for the unit measurement based on the summarizing, creating a score per unit measurement.

The set of acceleration metrics may comprise: a longitudinal positive acceleration, indicative of forward acceleration of the vehicle, a longitudinal negative acceleration, indicative of backward acceleration of the vehicle, a lateral positive acceleration, indicative of right turning acceleration of the vehicle, and a lateral negative acceleration, indicative of left turning acceleration of the vehicle.

The summarizing may comprise selecting said metrics having the largest magnitudes within collection periods as being representative of said collection periods or adding up, for each metric, the values collected during the collection period and dividing by the number of values collected during the collection period, for each collection period.

The method may further comprise calculating a jerkiness metric, for each of the metrics from each collection period, from the set of accelerometer metrics and wherein the metrics further comprise the jerkiness metric. Calculating may comprise calculating the change in a metric for two consecutive collection periods.

The method may further comprise adding a jerkiness penalty if the change in any metric for two consecutive periods is greater than an acceptable increment; the increment may be greater than 60% or less than −60%.

The summarizing may further comprise comparing, for each metric and for each collection period, the metric to a range of metric values, the range of metric values being divided into one or more range values each range value having a metric penalty, applying the metric penalty based on which range value the metric is in, and summing, for each metric, the metric penalties for each of the collection periods to create a set of metric sums.

Each metric may have one or more different metric penalties.

The scoring may further comprise weighting, by a set of weighting factors where each weighting factor corresponds to one of the metric sums in the set of metric sums, each metric sum in the set of metric sums to create a set of weighted metric sums, adding the set of weighted metric sums and dividing the added set of weighted metric sums by the sum of the weighting factors in the set of weighting factors.

There is also a system for analyzing the performance of a driver of a vehicle, using one or more metrics, in a transit organization, comprising: a set of acceleration data sources, an on-board unit (OBU) configured to collect, from one or more sources of acceleration data on the vehicle in each collection period during a unit measurement, metrics, the metrics comprising a set of acceleration metrics from the vehicle, transmit the metrics to a application data server, and an application data server, configured to receive the metrics from the OBU, summarize said metrics from each collection period collected from said vehicle during the unit measurement, and score the performance of the driver of the vehicle for the unit measurement based on the summarizing, creating a score per unit measurement.

The set of acceleration metrics may comprise a longitudinal positive acceleration, indicative of forward acceleration of the vehicle, a longitudinal negative acceleration, indicative of backward acceleration of the vehicle, a lateral positive acceleration, indicative of right turning acceleration of the vehicle, and a lateral negative acceleration, indicative of left turning acceleration of the vehicle.

The method summarizing may comprise adding up, for each metric, the values collected during the collection period and dividing by the number of values collected during the collection period, for each collection period.

The method may further comprise calculating a jerkiness metric, for each of the metrics from each collection period, from the set of accelerometer metrics, by calculating the change in a metric for two consecutive collection periods, and adding a jerkiness penalty if the change in any metric for two consecutive periods is greater than an acceptable increment, and wherein the metrics further comprise the jerkiness metric.

There is further a method for analyzing the performance of a driver of a vehicle, using one or more metrics, in a transit organization, comprising collecting, from one or more accelerometers on the vehicle from each collection period during a unit measurement, metrics, the metrics comprising a set of accelerometer metrics from the vehicle, summarizing said metrics from each collection period collected from said vehicle by unit measurement, scoring the performance of the driver of the vehicle for the unit measurement based on the summarizing, creating a score per unit measurement (SUD), obtaining a moving fuel used per unit distance (FUD) for the unit measurement, calculating a correlating factor between the FUD and the score per unit measurement for the driver and the vehicle.

The method may further comprise applying the correlating factor to a future SUD to determine fuel use, and where the future SUD was determined with the same driver as the SUD or where the future SUD was determined with the same vehicle type as the SUD.

The method may further comprise applying the correlating factor to a future FUD to determine operator performance, and where the future SUD was determined with the same driver as the SUD or where the future SUD was determined with the same vehicle type as the SUD.

The obtaining may further comprise receiving a reading of the fuel used for the unit measurement and deducting fuel used during idling during the unit measurement or creating an incident when fuel is used during idling while in an idle-free location but including such fuel in the FUD.

BRIEF DESCRIPTION OF THE DRAWINGS

The invention will now be described in more detail, by way of example only, with reference to the accompanying drawings, in which like numbers refer to like elements, wherein.

DETAILED DESCRIPTION OF THE EMBODIMENTS

Figure 1:
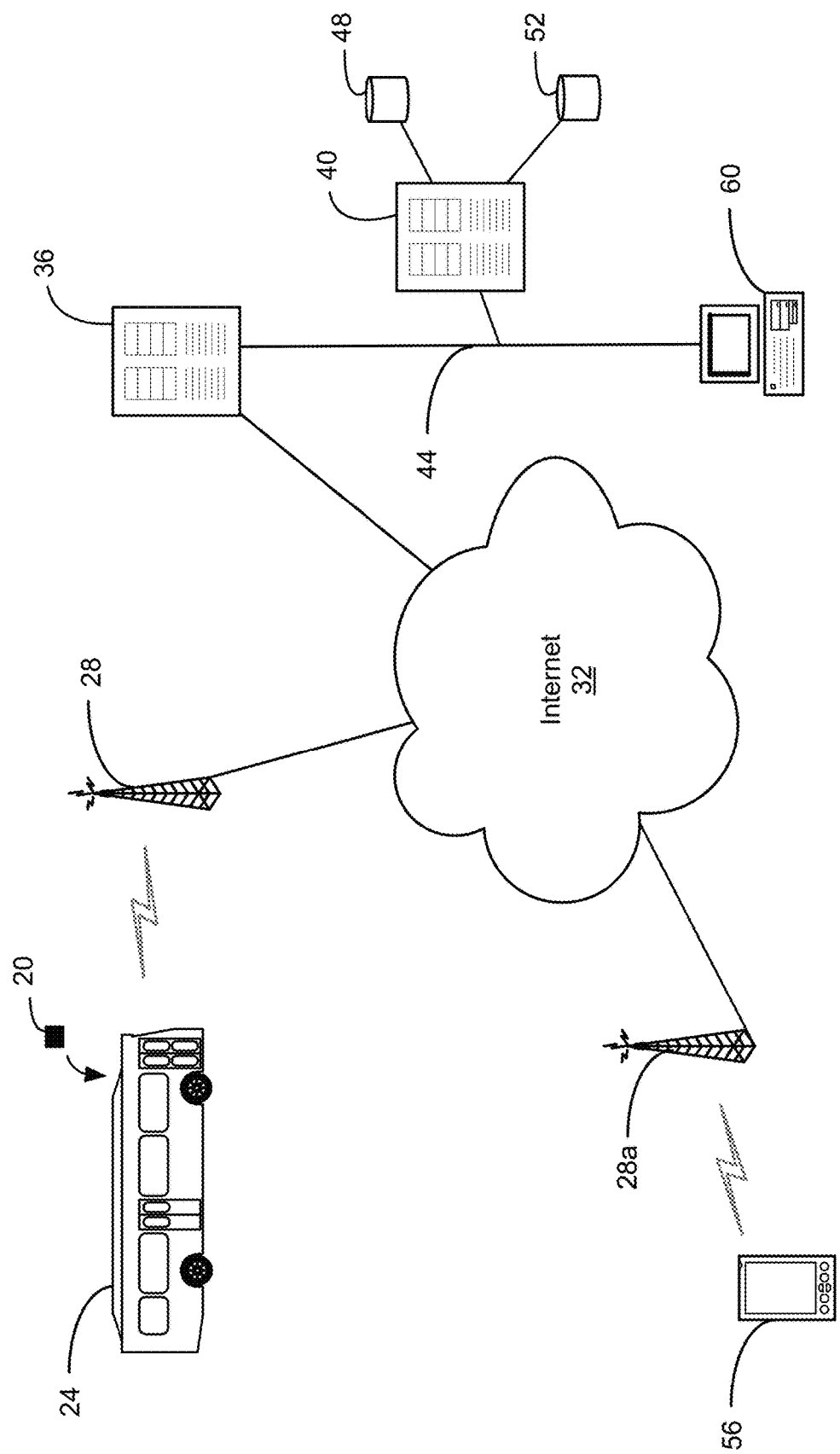
FIG. 1 is a schematic diagram of a system for analyzing performance data in a transit organization in accordance with an embodiment of the invention, and its operating environment.

It can be desirable for transit organizations to collect performance data for its vehicle fleet, and then analyze the performance data to more clearly understand it. If transit organizations could more readily recognize trends in the performance data and attribute the trends to specific factors, they could identify drivers that are good candidates for driver training and vehicles that would benefit most from servicing, as well as provide recognition to drivers performing well.

Performance, as the term is used herein, is measured by metrics. There are a variety of metrics that can be of interest to transit organizations. One set of metrics measures the acceleration (acceleration data), or g-force, experienced by a vehicle. These g-force metrics can provide a sense of how "hard" a driver is accelerating, braking or cornering. Another set of metrics relates to the "jerkiness" of a ride, or how much "jerk" is experienced (for example by a rider). "Jerkiness" generally refers to the rate of change of acceleration, with higher rates of change in acceleration being characterized as more "jerky". Examples of "jerky" driving include sudden hard acceleration from a standing start, and sudden hard braking. Relatively-high g-force and "jerkiness" metrics are associated with poor fuel economy, greater vehicle component wear and a poor passenger experience. A further metric is fuel economy. It is generally desirable to reduce the overall fuel expenditure of a transit organization. Still other metrics relate to, for example, the measured position of the acceleration pedal and the brake pedal. Intelligent comparison of these metrics permits analysis and evaluation of drivers and/or vehicles.

There are a number of factors that can affect the performance of transit vehicles and the services provided by a transit organization. Factors can be thought of as inputs that have a direct impact on the performance and quality of service over one or more routes. The two factors that will be discussed are the driver and the vehicle.

It is becoming increasingly important that transit organizations collect performance data and then analyze this data to more clearly understand what affects the efficiency and cost of their operations. Recognizing trends in the data and attributing trends to specific factors allows identification of underperforming assets (such as vehicles, parts and drivers) and taking appropriate action. In particular, relatively high g-force and "jerkiness" metrics are associated with greater vehicle component wear, poor passenger experience and poor fuel economy. A number of principles, measurable via one or more metrics that characterize good driving skills and habits are listed below.

Slow, Smooth Acceleration from a Stop:

Slow, smooth acceleration from a stop position consumes considerably less fuel than quick, heavy-footed acceleration. This may be referred to as longitudinal positive acceleration and may be part of a set of metrics and acceleration metrics.

Slow, Smooth Braking:

Slow, smooth breaking when approaching an expected stop causes significantly less wear on the break components of a vehicle in comparison to abrupt application of the brakes. Additionally, slow, smooth breaking provides a less jerky riding experience for commuters. This may be referred to as longitudinal negative acceleration (though it may be stored as a positive value) and may be part of a set of metrics and acceleration metrics.

Modest Idling:

When a vehicle is expected to remain stationary for a number of minutes, the savings on fuel consumption achieved by turning off the engine exceeds the cost of additional wear on the engine by restarting it. Further, in the course of a day transit vehicles will spend considerable time idling—picking up and dropping off passengers, waiting at traffic lights, road congestion, etc. As a consequence in any fuel analysis the idling usage (over which the driver has no control) should be removed (ie may be removed from FUD). There are also situations where excessive idling is not expected (for example, at a depot—an example of an idle-free location) and these need to be identified as 'incidents' and again should not be included in the driver and vehicle analysis but dealt with to reduce such incidents. Idling may generally be defined to occur when velocity is zero and fuel consumption is greater than zero.

Moderate Speed:

A vehicle experiences less wear and tear and consumes less fuel when driven at moderate speeds in comparison to higher speeds. By maintaining the RPM of the engine in a lower, more-efficient range, fuel can be saved. Further, moderate speeds are associated with lower incident rates and with reduced severity of incidents, and are thus associated with lower liabilities.

Minimal Anticipation:

Anticipation refers to the practice of releasing the brake pedal in anticipation of a green light or of gently applying the brakes in anticipation of a red light. As is often the case, a green light, for example, may occur more slowly than expected, resulting in a need to reapply the brake. The result is unnecessary jerking of commuters and additional wear on the brake components.

Fast Cornering:

Cornering while traveling at higher speeds exerts greater lateral g-forces on the vehicle and its passengers than cornering while traveling at lower speeds. In addition, cornering at higher speeds causes significantly higher wear on the tires of a vehicle. This may be referred to as lateral acceleration (with right turns being positive lateral acceleration and left turns being negative lateral acceleration though it may be stored as a positive value, for example).

Similarly, the condition of a vehicle can vary significantly, thus impacting the various metrics of the vehicle. There are many ways in which the condition of a vehicle can be poor. For example, the transmission may be faulty, leading to poor or irregular engagement of the drive train and ultimately to jerkiness in the ride. The brake system may not be operating well, causing braking to be jerky. A filter can be underperforming, either due to being dirty or otherwise malfunctioning. One or more spark plugs may not be firing correctly. The fuel injection system or carburetor may be performing irregularly. Any of these can result in poor ride quality.

Other factors can affect ride smoothness for individual runs. These other factors include, but are not limited to, the vehicle type, the route travelled, and the general time of day during a vehicle is operated. Other factors affecting a vehicle's metrics exist, such as irregular events that trigger fluctuations in the volume of fares or the traffic present, driving conditions precipitated by bad weather or passenger medical emergencies.

When analyzing performance data over a substantial period of time (for example three months), however, these factors become less significant than the general driving habits and skills of the driver, and the condition of the vehicle.

Figure 6:
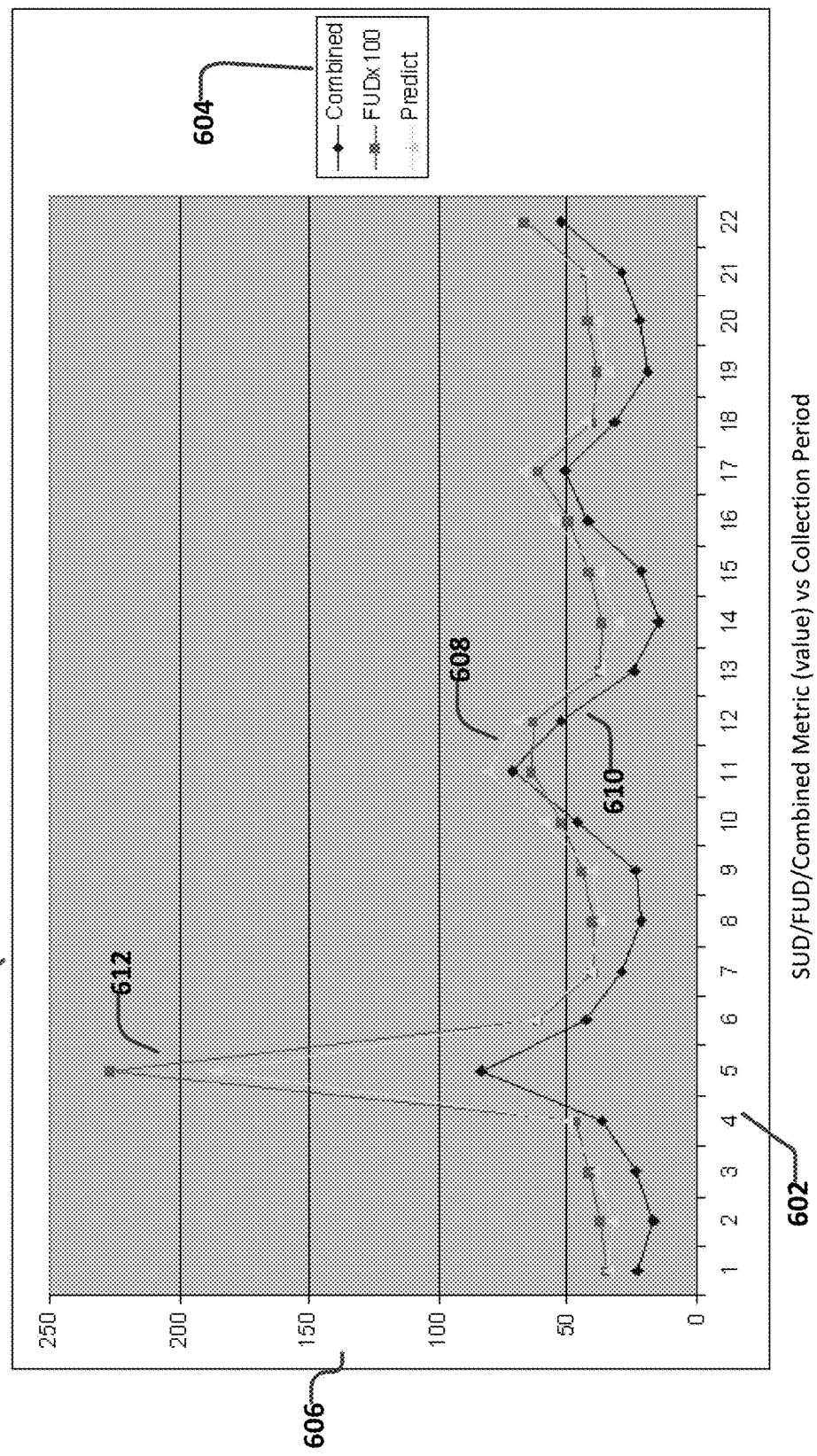
FIG. 6 is a graph showing an analysis of the performance data resulting from the invention.

By analyzing accelerometer metrics/data and other resulting metrics for drivers and/or vehicles, bad driving skills and habits, or bad vehicle condition, can be identified. In order to generate comparable performance data, the various accelerometer metrics can be collected over collection periods, summarized by one or more of i) selecting those accelerometer metrics having the largest magnitudes over the collection periods as representative of those collection periods, and scoring those representative accelerometer metrics, ii) measuring each accelerometer metric during the collection period, summing them, and dividing by the number of samples taken, and iii) taking the largest magnitude during the collection period. In one embodiment, ii) may be used in conjunction with iii) where the summed amount is used to determine a score and the data from iii) is used to track incidents. For example, if a collection period is short (ie a second) the values/scores produced via i) and ii) may be similar. Longer collection periods may result in greater differences. Such differences may overly penalize a driver for having to brake hard at a particular time (when it may be very normal for drivers to have to brake hard at least occasionally); but incidents may still be desirable to track (for example for driver evaluation and to provide warnings of incidents, as described herein). The scores are then further summarized by totaling them over a unit measurement/distance, and comparing them to a worst possible score or other benchmark to determine a relative score per unit measurement. It can be desirable to score accelerometer metrics corresponding to different driving scenarios. To better understand the driver's skill unit distance analysis can also be broken down into a number of complementary or elementary data, such as forward acceleration, braking and cornering (both left and right—as drivers/vehicles may experience greater difficulty with one direction of turns then the other) and jerkiness. The scoring and tallying of the accelerometer metrics separately for each driving scenario enables the calculation of an overall performance metric (such as SUD) that is a weighted average of the relative scores per unit measurement for each driving scenario. In this manner, different importance can be given to different driving scenarios. Further, by tracking a jerk metric in the same manner, this characteristic of the driver and/or vehicle can be analyzed. One approach to the data collection and how this data is used to calculate driver and vehicle 'scores' used in the analytical process is:

i) The OBU collects information from the accelerometer as well as from the engine (or from other sources of acceleration metrics/data as discussed herein). The various accelerometer and engine metrics are continuously monitored over a user specified time period and the maximum g-force values observed during this time period as well as the cumulative g-force values are stored (for example in both a positive and negative direction for both a longitudinal and lateral axis). At regular intervals during the day and/or when the vehicle returns back to the depot at the end of the work shift the information stored on the OBU is transmitted (GPRS and WiFi, or other communication types) to a database server—as described herein.

ii) The work performed by a driver during their workday is broken into Unit Distances (for example 500 meters). Calculations are made (as described herein), using the granular data collected on the OBU a Score per Unit Distance (SUD) as well as the Moving Fuel used per Unit Distance (FUD) (where fuel used when not moving—such as idling—is removed, and also where). In this way it is apparent that that the smoothness of the ride (SUD) is directly proportional to the fuel consumed when the vehicle is moving. In other words, if you determine and apply the proper factor, the SUD can tell you the FUD, for a particular one or more unit distances. This can be very helpful, for example where a vehicle has one of, but not both of, access to sufficient acceleration data (but not fuel gauge or use data) or fuel gauge or use data (but not acceleration data). Referring to FIG. 6, the relationship can clearly be seen by SUD/FUD graph 600, having a vertical axis 606 of values (of FUD/SUD/combined) and a horizontal axis 602 of a collection period or reading (essentially as time passes). In graph 600 legend 604 shows that there are three lines: 612 representing FUD multiplied by 100, predicted FUD and combined 610 (which is the score determined via SUD). The factors is applied to 610, resulting in line 608 which is quite close the actual FUD. Keeping at least one of the factors constant may assist in achieving accurate correlating through the factors (such as keeping the vehicle or vehicle type constant, or the driver constant for example). For example, when a factor is determine for a passenger bus and new driver on the same bus type may be evaluated based on their recorded fuel use (where the bus has a fuel gauge) or SUDs may be used to determine the fuel used by that driver.

System and Operating Environment

FIG. 1 shows a system for analyzing performance data in a transit organization in accordance with an embodiment of the invention, and its operating environment.

An on board unit ("OBU") 20, commonly referred to as a "black box", is installed in a transit vehicle 24. The OBU 20 is a device that collects performance data about the vehicle while the vehicle is in operation, temporarily stores the performance data, and then transmits the performance data at regularly scheduled intervals. The OBU 20 is secured inside the vehicle 24 so that it is not easily removable without the use of a screwdriver. The OBU 20 is shown in communication with a cellular base station 28 for transmission of the performance data. The cellular base station 28 is coupled to the Internet 32 via a number of intermediate proxies and servers that form part of the infrastructure of a cellular communications carrier (not shown).

A gateway 36 is also coupled to the Internet for receiving performance data from the OBU 20. The functionality of the gateway 36 is provided by an application service operating on a server of the transit organization. Upon receiving the performance data, the gateway 36 transfers the performance data to a database server 40 coupled to the gateway 36 over a local area network 44. The database server 40 stores the performance data in a performance data database 48. In addition, the database server 40 may manage a scheduling database 52 that may store scheduling information for vehicles and drivers in the transit organization. Some of the scheduling data is merged by the database server 40 with the performance data stored in the performance data database 48. Namely, driver-vehicle associations specifying which driver was operating which vehicle are transferred to the performance data database 48 for merging with the other performance data. Of course it is to be understood that driver-vehicle associations may accomplished in many ways, such as when a driver logs into the OBU or a ticket machine (not shown); associations from the OBU or ticket machine may be made by the OBU prior to transmitting data to gateway 36, or may be made by database server 40 after all the data is collected from the vehicle.

A mobile device 56 is also in communication with a cellular base station 28a that is similar to cellular base station 28 in many respects except that it may form part of the infrastructure of a separate cellular communications carrier. The cellular base station 28a is also in communication with the Internet 32 via a number of intermediate proxies and servers that form part of the infrastructure of the cellular communications carrier (not shown). The mobile device 56 permits a schedule manager to input and modify schedule changes, including driver changes, vehicle changes, and changes (such as real time changes) to runs along routes, and driver and vehicle assignments along routes (such as "short-turning" a vehicle).

An analysis computer 60 is coupled to the database server 40 over the local area network 44 for analyzing the performance data stored in the performance data database 40. The analysis computer 60 executes a monitoring application that has an "adapter" that receives data from the gateway 36. The "adapter" is a communication service that connects a browser-based monitoring tool to the gateway 36 and refreshes the latest performance data as the gateway 36 receives updates from the OBUs 20.

The monitoring application also has analysis tools that support generic reports and dashboards. For example, fuel monitoring tools include fuel consumption, fuel efficiency and idle time reports with drill-downs by date, vehicle, driver and pattern/schedule. In situations where a vehicle does not have accurate, or any, fuel consumption monitoring (or simply desires to use such an approach), driver/vehicle scores can be associated to fuel consumption (such as via a mathematical approach which may be as simple as applying a factor value). This may allow fuel consumption to be determined and tracked as driver performance is tracked. The scores herein have been shown to accurately perform such task with the right factor value (which can be achieved via base line testing of vehicles and drivers over certain numbers of samples).

Real-time and historical dashboards with a variety of visualizations (graphs, pie charts and gauges) are available to give managers a summary of the vehicle fleet's performance at a glance. Managers will also be able to set thresholds on specific performance metrics so that they may identify areas for potential improvement.

Additionally, the monitoring application has a component that can be used to determine driver and vehicle trends over time via analysis of the performance data in the performance data database 48. Using this information, the monitoring application can directly alert the fleet maintenance department that a particular vehicle is underperforming. Similarly, the monitoring application can directly alert human resources that a driver is exceeding performance expectations or underperforming.

Figure 2:
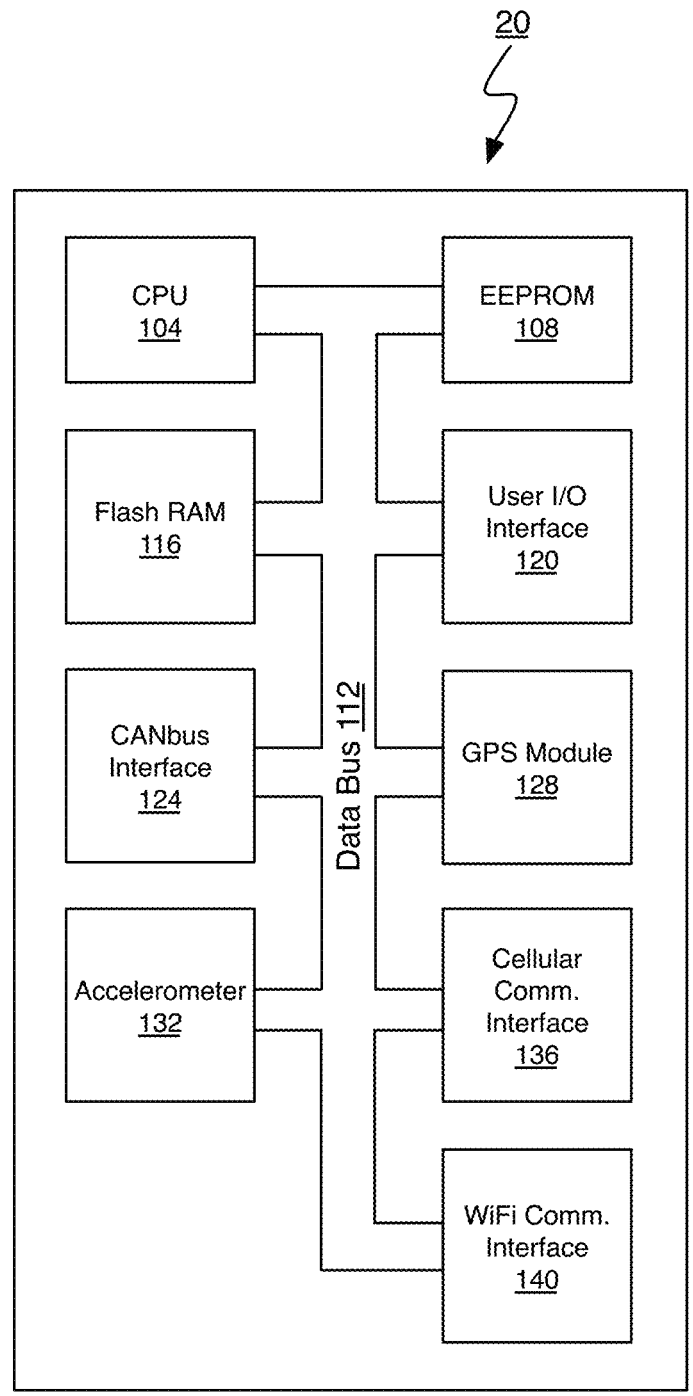
FIG. 2 is a block diagram of an on board unit installed in the vehicle shown in FIG. 1.

FIG. 2 is a schematic diagram showing a number of components of the OBU 20. The OBU 20 includes a central processing unit 104 that manages the operation the OBU 20 via an operating system stored in an EEPROM 108 and accessed over a local data bus 112. A bank of flash RAM 116 provides storage for settings and data collected during operation of the vehicle 20. In particular, 16 megabytes have been found to be sufficient for the application. A user input/output interface 120 permits configuration of the OBU 20. The user input/output interface 120 includes a USB port to enable the OBU 20 to be reprogrammed or reconfigured, and a reset button to reboot the OBU 20 when it is found to be functioning erratically.

A controller area network bus ("CANbus") interface 124 receives metrics from the engine and, similarly to a standard serial interface, uses a nine-pin connector. The CANbus interface reports 124 separate vehicle metrics, including, but not limited to, the engine temperature, the oil pressure, distance travelled (odometer deltas), speed, fuel usage, brake pedal position, throttle pedal position, and idle time. The particular metrics that are recorded by the OBU 20 are vehicle speed, fuel usage, breaking, throttle and idling.

While the CANbus interface 124 reports these metrics each second, it may not be desirable to report all these metrics to the gateway 36 or to store all of these metrics in the flash RAM 116. Accordingly, the OBU 20 processes and aggregates some of these metrics for user-defined n-second time intervals. For example, the distance travelled, fuel usage and idling time can be aggregated over ten-second time intervals, whereas speed, throttle pedal position and brake pedal position are averaged over the same intervals. The OBU 20 then records the performance data for this time interval in the flash RAM 116.

A global positioning system ("GPS") module 128 registers the position of the OBU 20 and, hence, the vehicle 24 in which the OBU 20 is installed. The OBU 20 can then append location information onto data collected to register its context. Additionally, the OBU 20 can transmit the location information to the gateway 36 to enable live tracking of the vehicle 24 and various other location-related functionality, as described herein.

An accelerometer 132 registers accelerometer/g-force metrics, which are measured along two axes, a longitudinal axis for measuring forward and backward acceleration, and a lateral axis for measuring lateral or side-to-side acceleration. The accelerometer 132 has a frequency of 20 Hz; that is, 20 readings per second are registered by the accelerometer for each of the two axes and reported to the OBU 20.

A cellular communications interface 136 communicates data collected by the OBU 20 to the gateway 36 via the cellular base station 28. The cellular communications interface 136 uses any one of GPRS, 1×RTT, EDGE, HSDPA, Mobitex, or another Internet Protocol-based data radio standard, to communicate with the cellular base station 28.

A WiFi communications interface 140 is also present in the OBU 20 for situations where less-frequent WiFi data uploads via short-ranged wireless communications are opted for in place of more frequent cellular communications.

Each OBU 20 has a unique identifier that is transmitted during communications either via the cellular communications interface 136 or via the WiFi communications interface 140. The unique identifier of the OBU 20 is associated with a vehicle 24 into which the OBU 20 has been installed, and this association is registered in a performance data database 48.

Data Collection and Analysis

Figure 3:
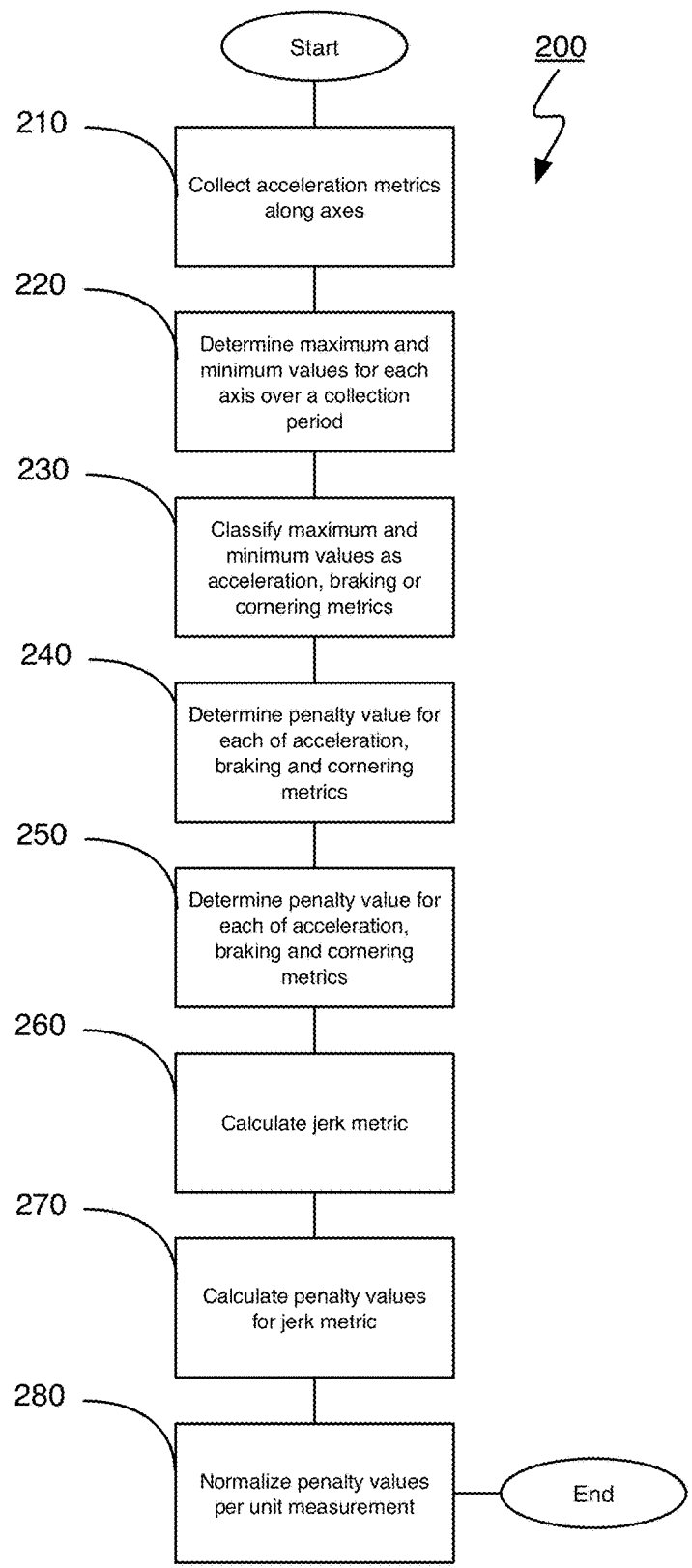
FIG. 3 is a flowchart of the general method of analyzing performance data carried out by the system of FIG. 1.

FIG. 3 shows the general method of analyzing performance data using the system of FIG. 1 generally at 200. As noted above, the accelerometer 132 reports 20 accelerometer metrics per second for each of the longitudinal and lateral axes. The OBU 20 receives these longitudinal and lateral accelerometer metrics and summarizes them over collection periods of a user-defined length or time period, two seconds presently.

The method commences with the collection of accelerometer metrics along the longitudinal and lateral axes (210). During each two-second collection period, 40 data points are collected for each of the longitudinal and lateral axes. G-forces relate directly to the accelerometer metrics measured across the longitudinal and lateral axes. As will be understood, acceleration, as used herein, shall refer to the rate of increase in forward velocity of a vehicle. Similarly, deceleration, as used herein, shall refer to the rate of decrease in forward velocity of a vehicle. Backward movement of the vehicle is very rare and is generally low magnitude and short periods of time (ie a vehicle reverses infrequently, for short duration, and at slower speed and smaller acceleration—additionally many vehicles either do not back up on routes or driver performance is only measured while on a route and not at a bay where reversing may occur). Positive accelerometer metrics along the longitudinal axis are associated with forward acceleration of the vehicle, and negative accelerometer metrics along the longitudinal axis are associated with slowing down or braking of the vehicle. Positive and negative accelerometer metrics along the lateral axis are associated with turning right and left respectively. This is referred to as cornering. A vehicle (and its passengers) experience g-forces laterally when the vehicle is cornering. The amount of g-forces experienced depends upon the linear speed that the vehicle is traveling at and the "sharpness" of the turn. G-forces experienced while the vehicle is turning either right or left are treated equally and interchangeably by the OBU 20.

After collecting accelerometer metrics over a collection period, the OBU 20 determines the maximum and minimum values of the accelerometer metrics for each of the longitudinal and lateral axes over the collection period (220). These maximum and minimum values define the range of metrics collected by the accelerometer 132 over the collection period for each axis. For either axis, the values may be a combination of positive, negative and zero (generally associated with stops or constant speed travel for the longitudinal axis). For example, in one collection period, the vehicle may be accelerating at the start, then braking towards the end, and the longitudinal accelerometer values will range from positive at the start of the collection period to negative at the end. Similarly, the vehicle may be cornering left at the start of a collection period, then travelling generally straight towards the end, and the lateral accelerometer metrics will range from negative at the start to zero at the end.

The OBU 20 then classifies the maximum and minimum values for the accelerometer metrics for each axis as acceleration, braking or cornering metrics (230). If the maximum accelerometer metric along the longitudinal axis is positive during a collection period, then that maximum relates to acceleration of the vehicle, and the OBU 20 sets it as the maximum acceleration metric for the collection period. If, instead, the maximum accelerometer metric along the longitudinal axis is negative or zero during a collection period, then no forward acceleration has occurred, and the OBU 20 sets the maximum acceleration metric to zero for the collection period. If the minimum accelerometer metric along the longitudinal axis is negative during a collection period, then that minimum relates to slowing down or braking of the vehicle. Here, the OBU 20 takes the absolute value of the minimum accelerometer metric to filter out the directional component and obtain its magnitude, and sets it as the maximum braking metric for the collection period. If, instead, the minimum accelerometer metric along the longitudinal axis is positive or zero during a collection period, then no slowing down or braking has occurred, and the OBU 20 sets the maximum braking metric for the collection period to zero. These metrics are thus selected as representative of the collection period for each driving scenario, or another approach, as described herein, may be used for the collection period.

The OBU 20 sets the maximum cornering metric as the maximum value of the absolute values of the lateral accelerometer metrics collected during the collection period. Cornering left and right may be treated equally, with the OBU simply looking at the magnitudes of the lateral accelerometer metrics to determine the largest value to use as the maximum cornering metric. However, left and right may be treated separately, with a maximum (and averages, as described herein) being stored separately—for example as vehicles and drivers may handle left and right turns differently (for example where a steering wheel is on one side or the other, or cars drive on one side of the road or the other).

Next, the OBU 20 determines a penalty value for each of the maximum acceleration, braking and cornering metrics determined at 230 for the collection period (240).

Figure 4:
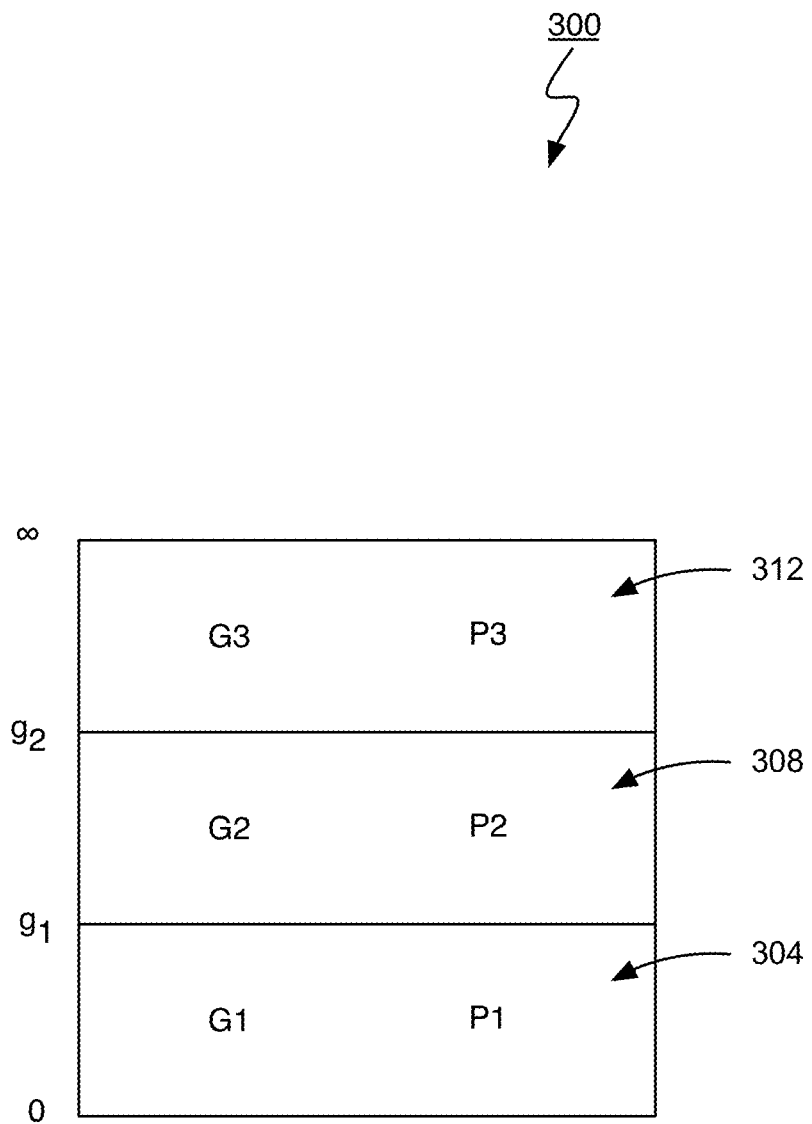
FIG. 4 is a schematic diagram of a template for scoring accelerometer metrics.

FIG. 4 shows a template 300 for determining penalty values for the maximum acceleration, braking and cornering metrics. The template consists of three ranges of values and three corresponding penalty values (noting of course that more than three can be used, but three are used for present description). A first range 304, labeled "G1", extends from zero to $g_1$ and has a corresponding penalty value of P1. A second range 308, labeled "G2", extends from $g_1$ to $g_2$ and has a corresponding penalty value of P2. A third range 312, labeled "G3", extends from $g_2$ and higher and has a corresponding penalty value of P3. Thus, if a maximum accelerometer metric is greater than or equal to $g_1$ and is less than $g_2$, a penalty value of P2 is assigned. Presently, separate templates are defined (such as by the user) to score each of the acceleration, braking and cornering metrics. While the range-defining points, $g_1$, $g_2$ and $g_3$, are the same (in the example herein, though they need not be) for the templates used to score acceleration, braking and cornering metrics, the corresponding penalty values vary between the three.

| Situation | G1 | G2 | G3 |
|---|---|---|---|
| Cornering | 0.0 | 3.0 | 20.0 |
| Braking | 0.0 | 5.0 | 10.0 |
| Acceleration | 0.0 | 7.0 | 30.0 |

The above table is used to determine a penalty value for the various metrics collected during a defined period. Note that a jerk penalty may be assigned based upon the change in the acceleration for two consecutive Collection Periods being greater than a user defined value or accepted increment—for example a 3.0 penalty point assigned to the penalty score if the rate of increase in the acceleration exceeds 60% between two successive OBU metric readings (as described below). As will be noted above, the penalty values are set to give higher scores for g-forces experienced while accelerating versus the same level of g-forces experienced while braking. These penalty values have been set so as it is accepted that vehicles will need to break quickly from time to time to avoid contact with other vehicles, pedestrians or other obstructions—which may be situations outside the control of the driver. Further, it is noted that hard acceleration is generally avoidable and detriments fuel economy significantly.

As data is downloaded from OBU 20, the system (such as server database) determines a penalty value for each of the maximum acceleration, braking and cornering metrics using the above tables (for example if there were 30 values of metrics then the maximum value would be the maximum penalty multiplied by the penalty value).

The OBU 20 then determines a penalty value for the jerk metric (270). The following table is used to determine a penalty value for the jerk metric for each of acceleration, braking and cornering for a collection period or unit measurement:

| Jerk metric | Penalty value |
|---|---|
| 60% or more | 3.0 |
| Less than 60% | 0.0 |

Once the penalty values have been determined for the maximum acceleration, braking and cornering metrics and the jerk metric, the OBU 20 normalizes the penalty values per unit measurement (280). In particular, the OBU 20 uses a unit measurement of distance of 500 meters, though clearly the particular distance may be changed or user-defined. The normalization process takes into account the distance used to determine the penalty value. In addition, it reduces the significance of outliers and better represents a driver's (and vehicle's) behavior over time. One-off anomalies can be captured via an incidence analysis process that is described below.

For purposes of the normalization process, a unit measurement, such as 500 meters, over which the performance data (i.e., the penalty scores) are normalized is selected. This unit measurement is user-defined at the set-up of the system and can be modified as desired later.

Figure 5:
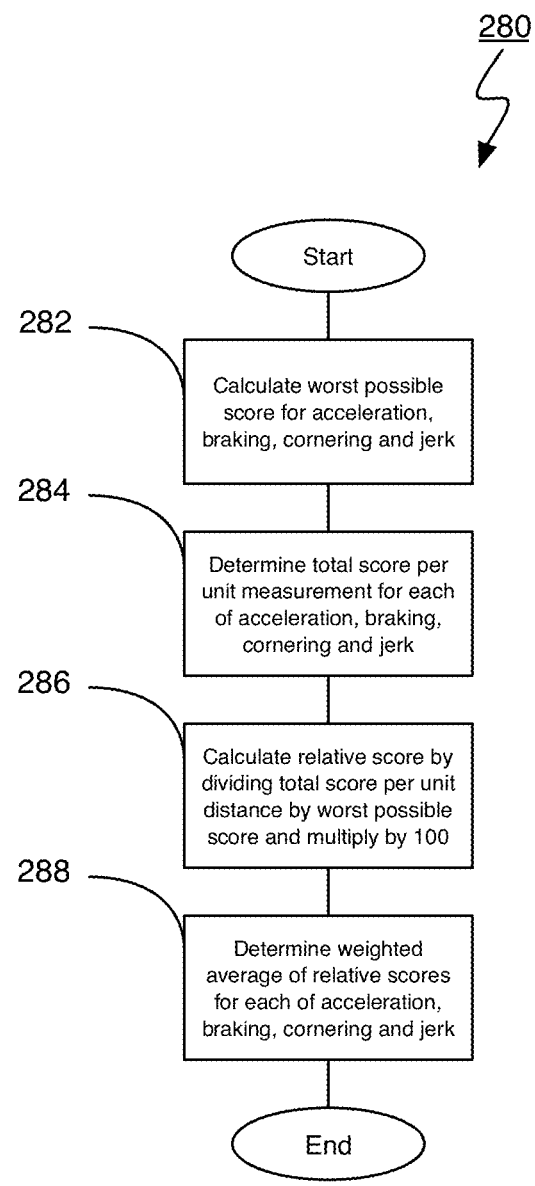
FIG. 5 is a flowchart of the method of normalizing the penalty values per unit measurement.

FIG. 5 shows the general method of normalizing the penalty values per unit measurement generally at 280. First, the worst possible scores that can be obtained over the selected unit measurement for each of acceleration, braking, cornering and jerk are calculated or obtained (282). These worst possible scores are universal constant numbers that are pre-generated to enable universal comparison. Next, the total score per unit measurement for each of acceleration, braking, cornering and jerk are determined (284), in at least one of the many ways described herein. Using the worst possible score for each of acceleration, braking, cornering and jerk determined at 282, relative scores for the unit distance/measurement for each of acceleration, braking, cornering and jerk are calculated as follows:

$$RSUM(A) = \frac{SUM(A)}{WPS(A)} \times 100,$$

where SUM(A) is the sum per unit distance/measurement for acceleration determined at 284, WPS(A) is the worst possible score for acceleration for the unit distance/measurement, and RSUM(A) is the relative score per unit distance/measurement (SUD) for acceleration;

$$RSUM(B) = \frac{SUM(B)}{WPS(B)} \times 100,$$

where SUM(B) is the sum per unit distance/measurement for braking determined at 284, WPS(B) is the worst possible score for braking for the unit distance/measurement (SUD), and RSUM(B) is the relative sum per unit distance/measurement for braking;

$$RSUM(C) = \frac{SUM(C)}{WPS(C)} \times 100,$$

where SUM(C) is the sum per unit distance/measurement for cornering determined at 284, WPS(C) is the worst possible score for cornering for the unit distance/measurement, and RSUM(C) is the relative sum per unit distance/measurement for cornering; and $$RSUM(J) = \frac{SUM(J)}{WPS(J)} \times 100,$$

where SUM(J) is the sum per unit distance/measurement for jerk determined at 284, WPS(J) is the worst possible score for jerk for the unit distance/measurement, and RSUM(J) is the relative sum per unit distance/measurement for jerk.

Once the relative scores per unit distance/measurement have been calculated, a weighted average of the relative scores per unit distance/measurement for each of acceleration, braking, cornering and jerk is determined (288). The weighted average is calculated as follows:

$$WSUM = \frac{W1 \times RSUM(A) + W2 \times RSUM(B) + W3 \times RSUM(C) + W4 \times RSUM(J)}{W1 + W2 + W3 + W4}$$

where W1, W2, W3 and W4 are weightings that are provided to each of the relative scores per unit measurement. In this particular case, the weightings should be chosen such that W1+W2+W3+W4=100. The weighted score per unit measurement can then be used to assess the performance of the driver and/or vehicle.

Presently, the OBU 20 sends the performance data to the gateway 36 every 30 seconds, although other frequencies can be used. The frequency can be adjusted to accommodate for, amongst other factors, the cost of data communications over the cellular communications network. In addition, the OBU 20 may store these weighted averages in storage.

Driver-Vehicle Association

The performance data collected via the OBU 20 and stored in the performance data database 48 is combined with scheduling data from the scheduling database 52 (or other data sources for driver-vehicle associations, as described herein) that indicates which driver was driving which vehicle at what day and time (for example by containing the planned schedule). When merged, this scheduling data becomes part of the performance data. In the absence of an existing driver identification system in vehicles, the system relies on driver-vehicle pairings from the scheduling database 52 from 'pull out' to 'pull in' of a driver with a vehicle 24 or other sources, as described herein.

The association of a driver with a vehicle stored in the scheduling database 52 comes from two sources of information—the planned service and the actual service. The planned service is the result of a formal scheduling process that considers the following when assigning drivers to vehicles:

- the trips that need to be performed
- the way these trips are linked together into vehicle assignments called blocks and defined by a pull-out time/location to a pull-in time/location
- the division of the vehicle assignments into pieces of work assignments for drivers called "runs" and defined by an 'on bus' time/location to an 'off bus' time/location
- the allocation of the work assignments to drivers, taking into account any planned absences, such as vacations The planned/scheduled service is planned using a bidding process that is a commonplace approach for problems where demand and supply are to be matched.

When a driver starts his work assignment, he is allocated a vehicle. The driver will stay with that vehicle until he is either relieved by another driver or the vehicle is returned back to the depot at the end of the block. This means that, for example during the day, based upon the work assignments, the driver can operate more than one vehicle and a vehicle can be operated by more than one driver over a block.

What actually happens on the day of service, however, may be very different from the planned service. Drivers may call in sick or not turn up and will need to be substituted, vehicles may break down and need to be replaced, and so on. In order to ensure that an accurate picture of the day is recorded, all the exceptions to the planned service must be noted. It is therefore a combination of the planned service and the recorded exceptions to that planned service that defines the true daily events for the drivers and the vehicles. Recording driver-vehicle assignments accurately is important if an accurate driver or vehicle performance analysis is to be performed.

Merging and Analysis of the Performance Data

During regular operation, the database server 40 merges the performance data from the performance data database 48 with the adjusted planned service data from the scheduling database 52 for the runs along the plurality of routes. In particular, during the merging, records for runs in the performance data are matched up with the adjusted planned service by determining when a vehicle was being operated by a particular driver, based on the pull-out and pull-in data, and associating runs for that vehicle over that period of time with that driver. Some checks are subsequently performed to evaluate the integrity of the data to ensure that the merged data is valid (e.g., that a driver was not registered as driving two vehicles simultaneously or that a vehicle was not performing two runs simultaneously).

The system handles driver and vehicle changes easily, as the unit measurement can be selected so that a driver/vehicle combination complete a number of unit measurements per pair-up.

The worst possible score can be varied in some scenarios, such as to take into consideration factors such as vehicle type (as different vehicle types have different operating characteristics), day-time period (as rush hour can have more start-stop traffic), etc. Generally, however, the worst possible score will be kept constant (even between unrelated transit agencies possibly in different countries, cities, climates, and the like—enabling comparison between drivers across the world).

While the unit measurement has been described as a distance, the unit measurement can also be a measurement of time.

Various methods of summarizing the acceleration metrics will occur to those skilled in the art. For example, each incident of exceeding a threshold acceleration in any direction can be scored, tallied or otherwise registered. The data associated with that incident (GPS location, acceleration data and other data relative to the driver/vehicle/environment) may be collected by OBU 20 and communicated along with other data from OBU 20. This may allow both scores and incidents to be used and monitored with monitoring application 60, and OBU 20 (such as for other routes, drivers, conditions).

While the invention has been described with reference to road vehicles, those skilled in the art will appreciate that it can also be applied to vehicles for transporting across other types of routes, such as rail, for example.

Various scoring schemes can be employed. The score for a collection period can be, for example, determined in accordance with a function of the accelerometer metric of the largest magnitude for an accelerometer metric for the collection period, or via various summing methods.

Calculations of the various scores, and aspects thereof, may be done, in whole or in part, on the OBU or any part of gateway 36, database server 40 or analysis computer 60. Factors influencing such selection may include bandwidth, use of the scores (how quickly they are needed, for example), processing power, and cost of communications.

Although acceleration metrics/data are largely described herein as originating from one or more accelerometers, other sources are also contemplated to be able to provide the required or useful data. Exemplary sources may include: GPS, wheel speed, turn sensors, gyroscopes, and the like.

This concludes the description of the presently preferred embodiments of the invention. The foregoing description has been presented for the purpose of illustration and is not intended to be exhaustive or to limit the invention to the precise form disclosed. It is intended the scope of the invention be limited not by this description but by the claims that follow.

The invention claimed is:

1. A method for analyzing the performance of a driver of a vehicle, using one or more metrics, in a transit organization, comprising:
   collecting, from one or more sources of acceleration data on the vehicle in each collection period during a unit measurement, metrics, the metrics comprising a set of acceleration metrics from the vehicle;
   obtaining a set of worst possible scores for the metrics during the unit measurement;
   summarizing said metrics from each collection period collected from said vehicle during the unit measurement; and
   scoring the performance of the driver of the vehicle for the unit measurement based on the summarizing and the obtaining, creating a score per unit measurement;
   associating a driver with a vehicle by comparing planned service data and actual service data; wherein planned service data is indicative of a driver scheduled to operate the vehicle prior to data being collected and actual service data is based on a driver identification system within the vehicle once the vehicle is in operation;
   wherein said scoring the performance of the driver accounts for said driver driving different vehicles as determined by said associating a driver with a vehicle step.

2. The method of claim 1 wherein the set of acceleration metrics comprise: a longitudinal positive acceleration, indicative of forward acceleration of the vehicle, a longitudinal negative acceleration, indicative of backward acceleration of the vehicle, a lateral positive acceleration, indicative of right turning acceleration of the vehicle, and a lateral negative acceleration, indicative of left turning acceleration of the vehicle.

3. The method of claim 2 wherein the summarizing comprises selecting said metrics having the largest magnitudes within collection periods as being representative of said collection periods.

4. The method of claim 2 wherein the summarizing comprises adding up, for each metric, the values collected during the collection period and dividing by the number of values collected during the collection period, for each collection period.

5. The method of claim 4 further comprising calculating a jerkiness metric, for each of the metrics from each collection period, from the set of accelerometer metrics and wherein the metrics further comprise the jerkiness metric.

6. The method of claim 5, wherein said calculating comprises calculating the change in a metric for two consecutive collection periods.

7. The method of claim 6 wherein the calculating further comprises:
   adding a jerkiness penalty if the change in any metric for two consecutive periods is greater than an acceptable increment.

8. The method of claim 7 wherein the acceptable increment is greater than 60% or less than −60%.

9. The method of claim 6 wherein the summarizing further comprises:
   comparing, for each metric and for each collection period, the metric to a range of metric values, the range of metric values being divided into one or more range values each range value having a metric penalty;
   applying the metric penalty based on which range value the metric is in; and
   summing, for each metric, the metric penalties for each of the collection periods to create a set of metric sums.

10. The method of claim 5 wherein each metric has one or more different metric penalties.

11. The method of claim 5 wherein the scoring further comprises:
   weighting, by a set of weighting factors where each weighting factor corresponds to one of the metric sums in the set of metric sums, each metric sum in the set of metric sums to create a set of weighted metric sums;
   adding the set of weighted metric sums and dividing the added set of weighted metric sums by the sum of the weighting factors in the set of weighting factors.

12. A system for analyzing the performance of a driver of a vehicle, using one or more metrics, in a transit organization, comprising:
   a set of acceleration data sources;
   an on-board unit (OBU) configured to:
      collect, from one or more sources of acceleration data on the vehicle in each collection period during a unit measurement, metrics, the metrics comprising a set of acceleration metrics from the vehicle;
      transmit the metrics to a application data server; and
   an application data server, configured to:

receive the metrics from the OBU;

obtain a set of worst possible scores for the metrics during the unit measurement;

summarize said metrics from each collection period collected from said vehicle during the unit measurement; and score the performance of the driver of the vehicle for the unit measurement based on the summarizing and the obtaining, creating a score per unit measurement associate a driver with a vehicle by comparing planned service data and actual service data; wherein planned service data is indicative of a driver scheduled to operate the vehicle prior to data being collected and actual service data is based on a driver identification system within the vehicle once the vehicle is in operation;

wherein said scoring the performance of the driver accounts for said driver driving different vehicles as determined by said associating a driver with a vehicle.

13. The system of claim 12 wherein the set of acceleration metrics comprise: a longitudinal positive acceleration, indicative of forward acceleration of the vehicle, a longitudinal negative acceleration, indicative of backward acceleration of the vehicle, a lateral positive acceleration, indicative of right turning acceleration of the vehicle, and a lateral negative acceleration, indicative of left turning acceleration of the vehicle.

14. The system of claim 13 wherein the summarizing comprises adding up, for each metric, the values collected during the collection period and dividing by the number of values collected during the collection period, for each collection period.

15. The system of claim 14 further comprising calculating a jerkiness metric, for each of the metrics from each collection period, from the set of accelerometer metrics, by calculating the change in a metric for two consecutive collection periods, and adding a jerkiness penalty if the change in any metric for two consecutive periods is greater than an acceptable increment, and wherein the metrics further comprise the jerkiness metric.

* * * * *